United States Patent
Dhuri et al.

(10) Patent No.: US 8,833,695 B2
(45) Date of Patent: Sep. 16, 2014

(54) AIRCRAFT HYDRAULIC AIR BLEED VALVE SYSTEM

(75) Inventors: Sanjeev N. Dhuri, Pune (IN); Rahul Bangar, Pune (IN)

(73) Assignee: Eaton Corporation, Cleveland, OH (US)

( * ) Notice: Subject to any disclaimer, the term of this patent is extended or adjusted under 35 U.S.C. 154(b) by 150 days.

(21) Appl. No.: 13/274,384

(22) Filed: Oct. 17, 2011

(65) Prior Publication Data

US 2013/0092245 A1 Apr. 18, 2013

(51) Int. Cl.
*B64C 13/36* (2006.01)
*F16K 24/00* (2006.01)
*F01D 17/26* (2006.01)
*F15B 21/04* (2006.01)

(52) U.S. Cl.
CPC ............... *F01D 17/26* (2013.01); *F16K 24/00* (2013.01); *F15B 21/044* (2013.01)
USPC .............................. 244/78.1; 137/12; 137/486

(58) Field of Classification Search
USPC ........................................................ 244/78.1
See application file for complete search history.

(56) References Cited

U.S. PATENT DOCUMENTS

| | | | |
|---|---|---|---|
| 3,006,580 A * | 10/1961 | Clarkson | 244/78.1 |
| 3,027,121 A * | 3/1962 | Griswold, II | 244/78.1 |
| 3,081,788 A * | 3/1963 | Lewis | 137/198 |
| 3,580,205 A * | 5/1971 | Bell et al. | 114/125 |
| 3,708,139 A * | 1/1973 | Wheeler | 244/3.13 |
| 4,538,228 A * | 8/1985 | Brearey et al. | 701/70 |
| 5,033,694 A * | 7/1991 | Sato | 244/78.1 |
| 5,220,837 A * | 6/1993 | Silverwater | 73/714 |
| 5,305,793 A * | 4/1994 | Cencula | 137/198 |
| 5,743,292 A * | 4/1998 | Robinson | 137/493.9 |
| 6,122,595 A * | 9/2000 | Varley et al. | 701/469 |
| 6,199,574 B1 * | 3/2001 | Harris | 137/199 |
| 6,386,222 B1 * | 5/2002 | Harris | 137/199 |
| 7,000,628 B2 * | 2/2006 | Ruesch et al. | 137/2 |
| 7,637,458 B2 * | 12/2009 | Near et al. | 244/78.1 |
| 7,739,909 B2 * | 6/2010 | Heise et al. | 73/290 V |
| 7,913,955 B2 * | 3/2011 | Jones | 244/226 |
| 7,931,239 B2 * | 4/2011 | Pedersen et al. | 244/189 |
| 8,235,027 B2 * | 8/2012 | Guterres et al. | 123/516 |
| 8,272,398 B2 * | 9/2012 | Erdmann | 137/533 |
| 8,333,217 B2 * | 12/2012 | Raper et al. | 137/557 |
| 2010/0319791 A1 * | 12/2010 | Dirkin et al. | 137/455 |
| 2011/0184590 A1 * | 7/2011 | Duggan et al. | 701/2 |
| 2012/0123628 A1 * | 5/2012 | Duggan et al. | 701/24 |
| 2012/0199698 A1 * | 8/2012 | Thomasson et al. | 244/175 |
| 2012/0320195 A1 * | 12/2012 | Tener et al. | 348/139 |

\* cited by examiner

*Primary Examiner* — Christopher P Ellis
*Assistant Examiner* — Medhat Badawi
(74) *Attorney, Agent, or Firm* — Rader, Fishman & Grauer PLLC

(57) ABSTRACT

An aircraft hydraulic air bleed valve system having an air vent valve connected to an electronic controller where the opening of the air vent valve is permitted only when the aircraft is in a pre-determined flight mode where the aircraft flight mode is determined by a gyroscope connected to the controller.

18 Claims, 2 Drawing Sheets

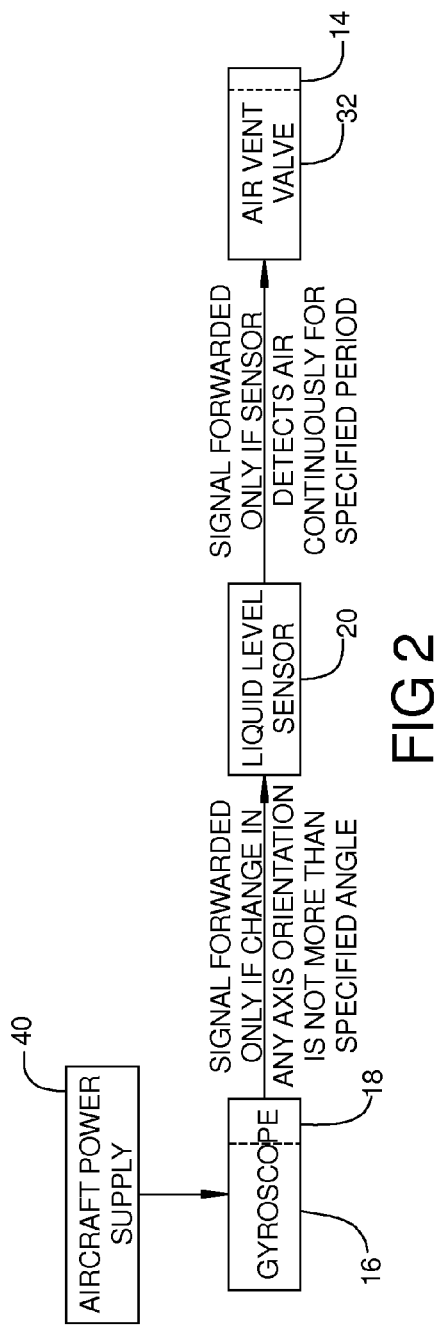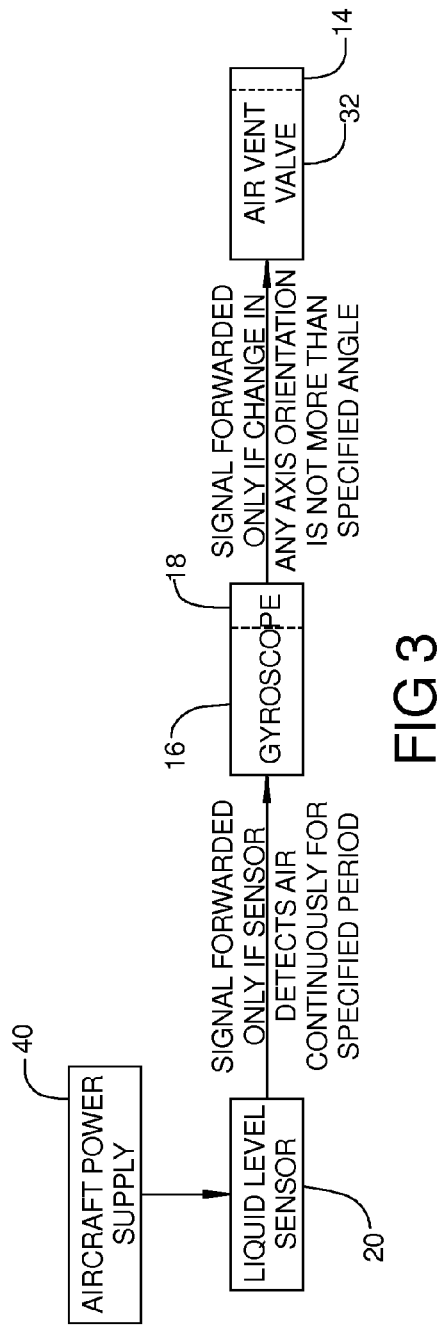

AIRCRAFT HYDRAULIC AIR BLEED VALVE SYSTEM

TECHNICAL FIELD

The exemplary aircraft hydraulic air bleed valve system relates, in general, to an air bleed valve and in particular to an aircraft hydraulic air bleed valve system that utilizes a gyroscope to determine when the aircraft is in a flight mode that is conducive to the bleeding of air from the hydraulic system and then permits the activation of an air vent valve.

BACKGROUND

Air bleed valves are used in aircraft hydraulic systems to remove unwanted air from the hydraulic circuit prior to the operation of the high pressure hydraulic system to prevent unexpected and unwanted operational anomalies. Due to certain flight regimes, a traditional air bleed valve cannot be used in certain high performance aircraft, primarily those aircraft used in military applications. High G loads and inverted flight modes do not allow the air in the hydraulic system to be bled when experiencing these flight regimes. Therefore it is necessary to use sensors to determine when there is air in the hydraulic system and then electronically open an air vent valve to discharge the air when the aircraft is flying in a suitable flight mode. Traditional air bleed valves are usually bled when the pilot manually triggers the vent valve circuit. Sensors can be used in the air bleed valve such as a light emitting diode and a photoelectric diode to indicate that there is air in the hydraulic system and then send a signal to the pilot that the air vent in the air bleed valve needs to be activated. Pub. No. US 2010/0319791 A1 to Dirkin et al. disclose such a system. In the Dirkin system two LEDs and a phototransistor and three transparent windows are used to sense the presence of air. When air is detected by an electronic circuit which is connected to the phototransistor and the LEDs, a signal is sent to the flight deck so that the vent valve can be activated. This system is subject to several operational limitations involving clouding of the windows and failure of the phototransistor.

Other bleed air systems known in the art include those shown in U.S. Pat. Nos. 4,524,793 and 4,813,446 to Silverwater et al. These prior art devices provide for the automatic bleeding of air at the time of hydraulic pump start up using differential pressure between the air and the hydraulic oil to move a piston to control the bleeding process. This system is self activating and is not controlled by the flight crew or an electronic control system so the air is automatically vented whenever it is present irrespective of the aircraft flight mode. This presents a problem in high performance aircraft since the air cannot be vented in certain flight regimes. Also, this type of air bleed valve is not as reliable or dependable as what is needed in the industry for use in high performance aircraft.

SUMMARY

The exemplary electronically controlled air bleed valve system provides for a robust solution for bleeding air from a hydraulic system whenever the level of air in a reservoir exceeds a set level and the aircraft in which it is installed is in a flight mode that is conducive to the bleeding of air from a fluid reservoir in an accumulator or housing. The quantity of excess air in the housing is measured with the use of some type of fluid level sensor such as one that makes use of light emitting diodes and a photoelectric sensor.

A gyroscope that includes a gyroscope control system is used to determine when the aircraft is in a proper orientation and flight regime for the activation of an air vent valve that is connected to the reservoir in the housing and opens upon receipt of an electrical command signal and vents the excess air outside of the housing and out of the aircraft hydraulic system. The exemplary air bleed valve system is particularly adaptable for use in aircraft in that the excess air can be sensed and then vented when the aircraft is in a suitable flight regime independent of the aircraft flight instruments. The exemplary system is mounted at the highest point where the air in the hydraulic system is collected and will bleed excess air even during flight so long as the aircraft is in a suitable flight regime or mode. Thus, the system will bleed air at appropriate times and will not result in leakage of the hydraulic oil from a reservoir during flight.

The gyroscope used in the exemplary air bleed system can be a standalone unit and electrically connected to the air vent valve controller or it can be physically integrated with the air vent controller in one package. The gyroscope can be any type of known gyroscope including what is known as a laser ring gyro so long as it can determine the aircraft orientation or flight mode to determine if the aircraft is in an orientation or flight mode that is suitable for the venting of the excess air from the aircraft hydraulic system. The gyroscope control system generates an electronic signal when the aircraft excess air can be vented and transmits this to another part of the system such as to an air vent valve controller. Alternatively, the gyroscope control system can simply send a signal representation of the aircraft's orientation or flight mode to another circuit or controller and that unit can determine if the aircraft is in an orientation and flight mode suitable for the venting of excess air. The air vent valve controller is electrically connected to the air vent valve and to the liquid level sensor in addition to the gyroscope control system. The liquid level sensor generates an electrical signal that represents the level of the hydraulic oil in the housing and hence, the quantity of excess air residing above the oil can be calculated. Once the excess air reaches a given quantity and the aircraft is in a suitable orientation and flight mode as determined by the gyroscope, then the air vent valve can be activated and the excess air is purged from the aircraft hydraulic system.

BRIEF DESCRIPTION OF THE DRAWINGS

FIG. 2 is an alternative functional block diagram of the exemplary aircraft air bleed valve system; and FIG. 3 is a second alternative functional block diagram of the exemplary aircraft air bleed valve system.

DETAILED DESCRIPTION

Figure 1:
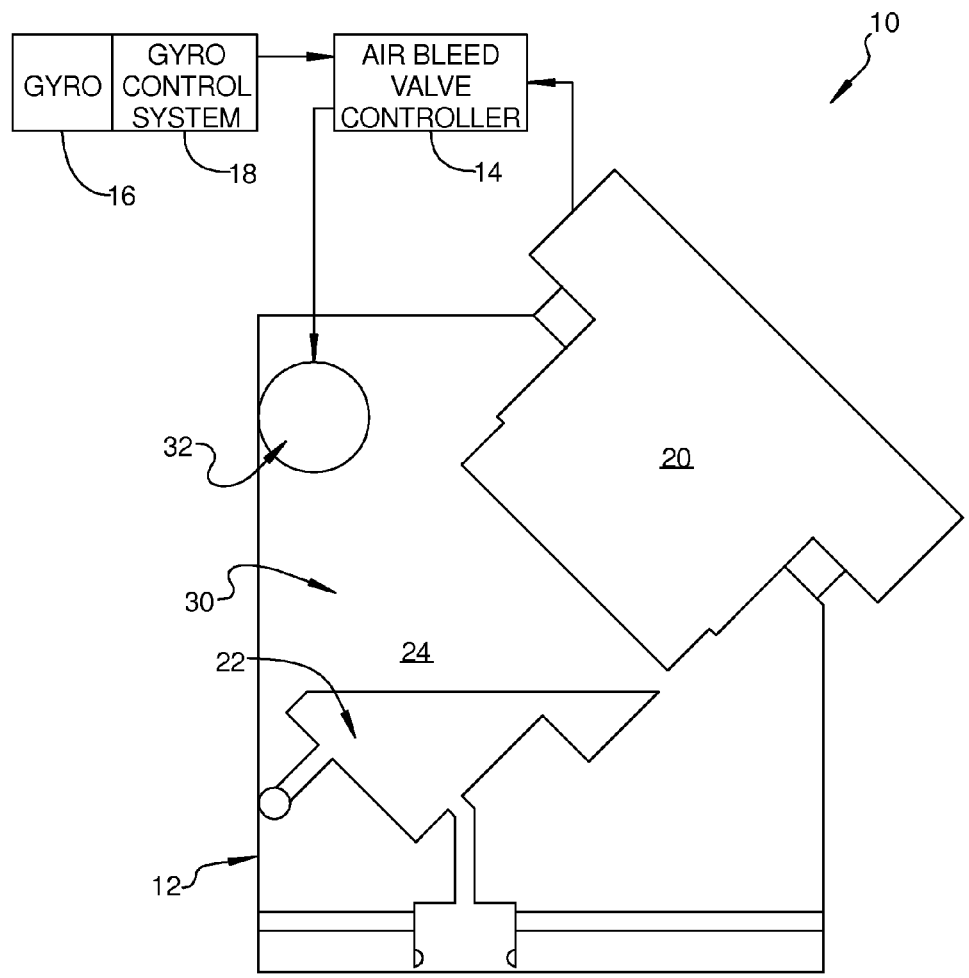
FIG. 1 is a cross-sectional view of the exemplary aircraft air bleed valve system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

Now referring to FIG. 1 of the drawings, a cross-sectional view of the exemplary aircraft air bleed valve system 10 is shown. The air bleed valve system 10 includes an accumulator housing 12 which has a reservoir 24 for containing a quantity of hydraulic oil 22 and a varying quantity of excess air 30. Mounted to the housing 12 is a liquid level sensor 20 which is positioned to sense the level of the hydraulic oil 22 in the reservoir 24 and is electrically connected to an air bleed valve controller 14. The air vent valve 32 is vented outside of the housing 12 and can be opened and closed in response to an activation signal. The air vent valve 32 is also electrically connected to the air bleed valve controller 14.

The air bleed valve controller 14 can be a separate electronic circuit or it can be integrated with the liquid level sensor 20. The liquid level sensor 20 can use a photoelectric sensor such as a phototransistor and light emitting diodes LEDs to measure the level of the hydraulic oil 22 within the reservoir 24. In the alternative, other types of liquid level sensing systems can be used such as one the uses liquid contact sensors such as acoustic wave sensors. Since the volume of the reservoir 24 is known, the quantity of the excess air 30 can then be determined based on the measured level of the hydraulic oil 22 in the housing 12.

A quantity of excess air 30 is shown residing above the hydraulic oil 22. The electronically activated air vent valve 32 is mounted to the top section of the reservoir 24 which remains closed until a signal is generated by the air bleed valve controller 14 to cause it to open. Upon opening, the air vent valve 32 vents the excess air 30 to the outside of the housing 12. The vent valve 32 can be a solenoid or a stepper motor or any other type of opening and closing valve whose state is electronically controlled.

A gyroscope 16 is shown whose operation is electronically controlled by a gyroscope control system 18. The gyroscope 16 can be any type of know gyroscope system such as a laser ring gyroscope. The gyroscope 16 is used to determine the flight regime and orientation of the aircraft in which it resides and the gyroscope control system 18 generates this information and then transmits it to the air bleed valve controller 14 or processes it and generates a aircraft mode signal when the excess air can be bled from the aircraft by opening the air vent valve 32. The gyroscope control system 18 and the air bleed valve controller 14 and the liquid level sensor 20 electronics can be integrated into various packages or it can all be integrated into one package and connected to the aircraft electrical power supply.

Thus the operation of the exemplary aircraft air valve system 10 is electronically controlled according to the signals generated by the gyroscope control system 18 which generates an aircraft mode signal, and the liquid level sensor 20 which generates a liquid level signal. The air bleed valve controller 14 processes these signals and generates an activation signal that is sent to the air vent valve 32 when the excess air, if present in a sufficient quantity, can be vented out of the reservoir 24.

The gyroscope control system 18 processes the signals generated by the gyroscope 16 and generates a separate aircraft mode signal that is transmitted to the air bleed valve controller 14. The aircraft mode signal can represent the orientation and flight mode of the aircraft or it can represent that the aircraft is in an orientation and flight mode of the aircraft that is suitable for the venting of the excess air 30 and the air vent valve 32 can be opened if there is sufficient excess air 30 present in the reservoir 24 as determined within the air bleed valve controller 14 using software algorithms.

The quantity of the excess air 30 is determined either within the liquid level sensor 20 or within the air bleed valve controller 14. Thus, the exemplary air bleed system 10 provides for the automatic determination of the quantity of excess air 30 in the aircraft hydraulic system and then the automatic bleeding of that excess air 30 only when the aircraft is in a suitable orientation and flight mode.

Now referring to FIG. 2 of the drawings, an alternative functional block diagram of the exemplary air bleed valve system 10 is shown. This functional block diagrams illustrates how the electronic software operates within the air bleed valve systems 10. This air valve bleed system 10' is mounted within an aircraft structure and controls the removal of excess air from the aircraft hydraulic system. An aircraft electrical power supply 40 is connected to the gyroscope 16 through the gyroscope control system 18 and provides electrical power to other circuits as well, such as the liquid level sensor 20 and the air bleed valve controller 14. The gyroscope 16 can be what is known as a laser ring gyroscope or any other type of electrically powered or otherwise powered device that can detect when the aircraft is in a flight regime that will allow for the venting of the excess air 30 out of the reservoir 24. The gyroscope control system 18 processes the signals generated by the gyroscope 16 and then generates either an aircraft signal that represents the orientation and/or flight mode of the aircraft that is sent to the air valve controller which is part of the liquid level sensor 20 or it can generate a aircraft signal that represents when the aircraft is in an orientation and flight mode that is conducive to the venting of the excess air 30.

The liquid level sensor 20 generates a level signal that is transmitted to the air valve bleed controller 14. By knowing the level of the hydraulic fluid 22 in the reservoir 24, the quantity of excess air 30 can be calculated. If the quantity of excess air 30 exceeds a pre-determined level for a pre-determined length of time, and the aircraft is determined to be in a suitable orientation and flight mode, then the liquid level sensor 20 generates an activation signal that is sent to the air vent valve 32 to open it and allow the excess air to be vented outside of the aircraft hydraulic system.

The gyroscope control system 18 can be physically attached to the gyroscope 16 or it can be located elsewhere in the aircraft and only electrically connected to the gyroscope 16. Likewise, the air bleed valve controller 14 can be separated out from the liquid level sensor 20 as shown in FIG. 1 and made a separate unit or it can be made a physical part of the gyroscope controller 18. The physical packaging of the electronics is up to the designer and offers extreme flexibility.

Now referring to FIG. 3 of the drawings, a second alternative functional diagram of the exemplary aircraft air bleed system 10 is shown. This functional block diagram illustrates how the electronic software operates within the air bleed valve system 10. The aircraft electrical power supply 40 supplies electrical power to the liquid level sensor 20 and to the gyroscope 16 and to the gyroscope control system 18 and to the air bleed control system which is integrated into the liquid level sensor 20. The level of the hydraulic oil 22 in the reservoir 24 is measured by the liquid level sensor 20. The liquid level sensor 20 is shown having one or more LEDs that reflect off the top of the hydraulic oil and the amplitude of the reflected light is measured by a photo detector. The output of the photo detector is sent to a circuit that calculates the quantity of the excess air based on the level of the hydraulic oil and the volume of the reservoir 24. This level signal is then sent to the gyroscope system controller 18. The gyroscope system controller 18 interfaces with the gyroscope 16 and process the output of the gyroscope 16 to determine the orientation and flight mode of the aircraft. The gyroscope 16 operating in conjunction with the gyroscope control system 18 determines when the aircraft is in a suitable orientation and flight mode to permit the excess air to be safely vented out of the reservoir 24 through the air vent valve 32. Whenever the aircraft is in this orientation and flight mode and at the same time the level signal from the liquid level sensor 20 indicates that the excess air 30 needs to be vented, then the gyroscope control system 18 send an activation signal to the air vent valve 32 to cause it to open and vent the excess air 30 out of the aircraft hydraulic system.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

We claim:

1. An air bleed valve system for an aircraft hydraulics system comprising:
   a gyroscope for measuring the orientation and flight mode of the aircraft;
   a gyroscope control system for analyzing signals from the gyroscope and generating an aircraft signal when the aircraft is in a flight orientation and flight mode that is suitable for the bleeding of excess air from the aircraft hydraulic system;
   a liquid level sensor mounted in a housing to measure the level of hydraulic oil within said housing, said liquid level sensor generating a level signal when said excess is in sufficient quantity to require bleeding;
   an air bleed valve controller electrically connected to said liquid level sensor and to said gyroscope control system, said air bleed valve controller generating an activation signal when said aircraft signal and said level signal indicate that said excess air requires venting; and
   an air vent valve mounted in said housing, said air vent valve opening in response to said activation signal and venting said excess air outside of said housing;
   wherein said gyroscope is a laser ring gyroscope and a stand alone unit.

2. The air bleed valve system of claim 1, wherein said liquid level sensor includes at least one light emitting diode.

3. The air bleed valve system of claim 1, wherein said liquid level sensor includes at least one acoustic wave sensor.

4. The air bleed valve system of claim 1, wherein said air bleed valve controller is integrated with said gyroscope control system.

5. The air bleed valve system of claim 1, wherein said air bleed valve controller is integrated with said liquid level sensor.

6. An air bleed valve system for an aircraft comprising:
   a housing having a reservoir for containing hydraulic oil and a level of excess air;
   a liquid level sensor mounted to said housing for measuring the level of said hydraulic oil within said reservoir and then calculating the quantity of excess air and generating a level signal when said quantity of excess air exceeds a pre-determined level;
   an air vent valve mounted in said housing and extending into said reservoir, said vent valve opening in response to an activation signal;
   a gyroscope disposed to measure the orientation and flight mode of the aircraft, said gyroscope generating an aircraft signal when said aircraft is in an orientation and flight mode that is conducive to the venting of said excess air;
   wherein said activation signal is transmitted to said air vent valve upon receipt of said aircraft signal and of said level signal;
   wherein said gyroscope is a laser ring gyroscope and a stand alone unit.

7. A method of bleeding excess air from an aircraft hydraulic system comprising:
   providing a hydraulic housing having a reservoir;
   providing an air vent valve mounted to said housing and accessing said reservoir;
   providing a liquid level sensor mounted to said housing and positioned to sense the level of a hydraulic oil residing in said reservoir, said liquid level sensor generating a level signal;
   providing a gyroscope and a gyroscope control system for sensing the orientation and flight mode of the aircraft, said gyroscope control system generating a flight signal;
   generating an activation signal to said air vent valve when said flight signal and said level signal indicate that the excess air needs to be vented through said air vent valve.

8. The method of bleeding excess air from an aircraft hydraulic system of claim 7 further comprising providing an air bleed valve controller to generate said activation signal.

9. The method of bleeding excess air from an aircraft hydraulic system of claim 7 wherein said gyroscope control system generates said activation signal.

10. The method of bleeding excess air from an aircraft hydraulic system of claim 7 where said liquid level sensor generates said activation signal.

11. The air bleed valve system of claim 6, wherein said gyroscope is a laser ring gyroscope detecting when the aircraft is disposed in a flight regime that permits said excess air to be vented out of said reservoir.

12. The air bleed valve system of claim 7, wherein said gyroscope is a laser ring gyroscope detecting when the aircraft is disposed in a flight regime that permits said excess air to be vented out of said reservoir.

13. The air bleed valve system of claim 6, wherein said liquid level sensor generates said activation signal in response to the quantity of said excess air exceeding said pre-determined level for a predetermined length of time and said aircraft being in an orientation and flight mode that is conducive to the venting of said excess air.

14. A method for operating an air bleed valve system, comprising:
   generating a plurality of signals indicative of an aircraft being in a flight regime that allows venting of excess air out of a reservoir, and said plurality of signals are generated by a gyroscope;
   generating an aircraft signal based on said plurality of signals generated by said gyroscope, and said aircraft signal is indicative of said aircraft being in an orientation and a flight mode that are conducive to venting said excess air;

generating a level signal indicative of a level of a hydraulic fluid in said reservoir;

determining a quantity of said excess air based on said level signal;

generating an activation signal in response to said aircraft signal and further in response to determining that said quantity of excess air exceeds a predetermined level for a predetermined length of time; and opening an air vent valve to allow said excess air to be vented outside of aircraft hydraulic system in response to said activation signal.

15. The method of claim 14, wherein a gyroscope control system analyzes said signals from said gyroscope and generates said aircraft signal.

16. The method of claim 15, wherein a liquid level sensor mounted in a housing measures the level of hydraulic oil within said housing and generates said level signal when said excess is in sufficient quantity to require bleeding.

17. The method of claim 16, wherein an air bleed valve controller is electrically connected to said liquid level sensor and to said gyroscope control system, said air bleed valve controller generates said activation signal when said aircraft signal and said level signal indicate that said excess air requires venting.

18. The method of claim 17, wherein said liquid level sensor includes at least one of at least one light emitting diode and at least one acoustic wave sensor.

* * * * *